July 9, 1957

J. W. LEE 2,798,396

FREE CENTER DEVICE

Filed Oct. 29, 1952

INVENTOR.
JOHN W. LEE
BY
HIS ATTORNEY

2,798,396
FREE CENTER DEVICE
John W. Lee, Dayton, Ohio

Application October 29, 1952, Serial No. 317,535

2 Claims. (Cl. 82—33)

This invention relates to a free center device for the tail stock of a lathe or similar apparatus.

An object of this invention is to provide a free center device having a series of anti-friction bearings for supporting the rotatable work engaging member within the main body of said free center device.

Another very important object of this invention lies in the selecting, arranging and assembling of the anti-friction bearings in such a manner as to make it impossible to subject any one of said bearings to a substantially greater axial or radial load than any other bearing of the series.

Another object of this device is to provide a free center device in which the anti-friction bearings are assembled alternately opposed, whereby each bearing is automatically self-adjusting for wear.

A further object of this invention is to provide a free center device of such construction that by virtue of its self-adjusting feature prevents radial movement of the rotatably engaging member in relation to the main body during its useful life.

Other objects and advantages reside in the construction of parts, the combination thereof and the mode of operation, as will become more apparent from the following description.

Figure 1:
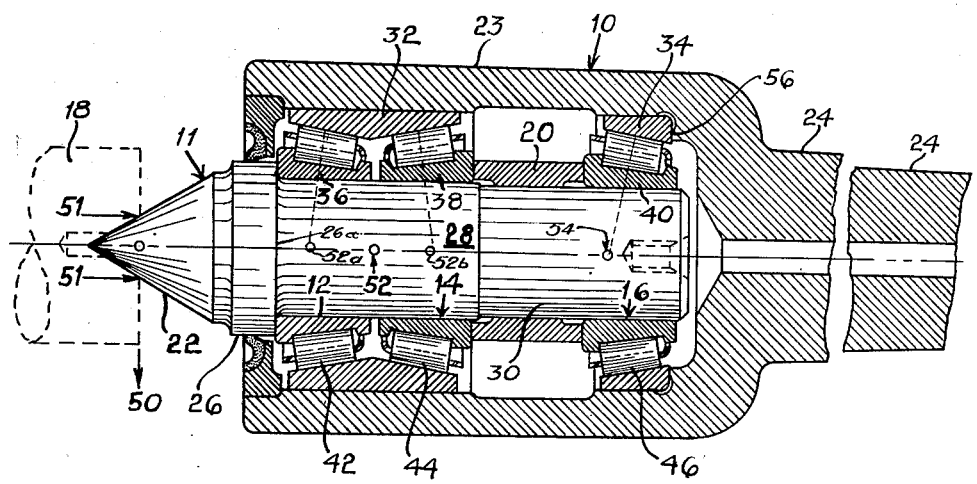

Figure 1 in the accompanying drawing discloses a cross sectional, longitudinal view of a free center device in which tapered type anti-friction bearings are used.

Figure 2:
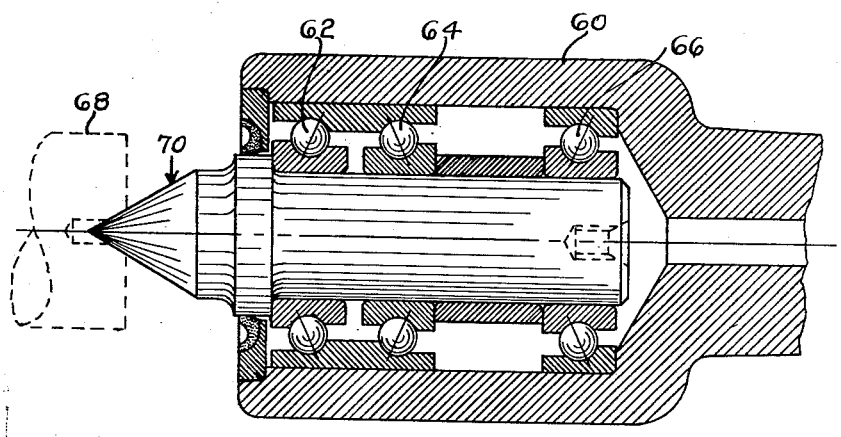

Figure 2 discloses a cross sectional longitudinal view of a modification of a free center device in which angular type ball bearings are used.

Referring to the drawings, the reference numeral 10 indicates the main body of a free center device. This main body 10 includes a cylindrical portion 23 and a suitable supporting frame 24. The cylindrical portion 23 is provided with a cylindrical cavity in which is supported a spindle 11 mounted for rotation in the anti-friction bearings 12, 14 and 16. The spindle 11 is provided with a work engaging portion 22. For the purpose of illustration, a work piece 18 has been shown schematically in engagement with the work engaging portion 22. The inner races of the bearings 14 and 16 are held in spaced relation by a spacer 20. As clearly seen in Figure 1, the length of the spacer 20 is greater than the length of the inner race of each of the bearings. By this arrangement, two bearings are closely spaced together and the bearing at the end is remotely spaced from the pair of closely spaced bearings. The spindle 11, in addition to the work engaging conical portion 22, is provided with a cylindrical collar 26 terminating in an abutment shoulder 26a. The inner races of the bearings 12 and 14 are mounted upon the cylindrical portion 28 of the spindle 11. The anti-friction bearings 12 and 14 have a common outer race 32 tapering from the center line outwardly in opposite directions, one tapered surface of race 32 cooperating with a tapered surface of the inner race 12 to rotatably support the roller bearing 42 and the other tapered portion of the race 32 cooperating with the inner race 14 to rotatably support the roller bearing 44.

A spacer 20 surrounds the cylindrical portion 30 of the spindle 11 and is mounted between the inner race of the anti-friction bearing 14 and the inner race of the anti-friction bearing 16. The outer race 34 of the bearing 16 engages a shoulder 56 located near the inner end of the cylindrical cavity of member 23. The spacer 20 holds the inner races of the bearings 14 and 16 in proper spaced relation.

As is well known to those skilled in the art, the work piece 18 exerts several forces upon the work engaging portion of the spindle 11. There is the weight of the work piece, the centrifugal forces caused by unbalanced conditions of the work piece and the end thrust force exerted upon the work engaging portion. The weight and the centrifugal force may be represented by the arrow 50 and the end thrust force may be illustrated by the arrows 51.

Where tapered roller bearings are used like those shown in Figure 1, the effective direction of the force extending from the axis of rotation of the spindle to the roller bearing is along a perpendicular extending from the center of the outer race of the bearing and intersecting the axis of rotation. The normal or perpendicular to the center of the outer race of the bearing 36 intersects the axis of rotation of the spindle at 52a. The normal or perpendicular from the center of the outer race of the bearing 38 intersects the axis of rotation at the point 52b, that is, the forces exerted against the spindle are transmitted along the lines from the points 52a and 52b to the bearings 36 and 38 respectively. The resultant of the forces of the first pair of bearings, namely, bearings 36 and 38, is indicated by the direction of the arrow 52 which is midwise between 52a and 52b. A normal to the outer race of bearing 34 intersects the axis of rotation at the point indicated by the arrow 54.

By virtue of the arrangement and the location of the bearings 12, 14 and 16, there is a radial force equal to the force represented by the arrow 50, which force may be assumed to act on a point 54 located within the bearing 16. The point 52, which lies substantially midway between the point where the work engages the spindle and the point 54, may be referred to as a fulcrum point. As is well known to those skilled in the art, in a lever of the first class, the force exerted upon the fulcrum is equal to the sum of the forces exerted by the load and the force exerted upon the opposite end of the lever. In other words, the force exerted upon the fulcrum 52 is equal to the force 50 plus the force 54. The point 52 is located between the bearings 12 and 14, so that the bearings 12 and 14 share the force exerted upon the fulcrum 52 equally. That being the case, the load carried by each of the bearings 12, 14 and 16 is substantially equal, which load is equal to the force exerted in the direction of the arrow 50 by the work piece. This force 50 might be referred to as a resultant obtained by combining the centrifugal force and the weight at any one instant of time. In the absence of a perfectly balanced work piece, this resultant force will vary throughout each revolution of the work and of the spindle 11. Thus, it will be seen that the spacing of the bearings is such that the forces exerted by the load upon the bearings are substantially equally distributed.

The inner races 36 and 38 of the anti-friction bearings 12 and 14 are very lightly press-fitted to the cylindrical portion 28 of the spindle 11. The spacer 20 and the inner race 40 of the bearing 16 are also very lightly press-fitted to the cylindrical portion 30 of the spindle 11. The outer race 32 of the bearings 12 and 14 and the outer race 34 of the bearings 16 are very lightly press-fitted into the cylindrical cavity of the main body 10.

That being the case, it is quite obvious that a slight force exerted on the spindle 11 will cause a sufficient axial movement of all members of the bearings to cause them to remain perfectly seated, thus automatically compensating for wear as it occurs.

The work piece 18 also exerts an axial force, as indicated by the arrows 51, which is transmitted to the work engaging portion 22 of the spindle 11. This force is transmitted without change in magnitude successively through the abutment shoulder 26a of the spindle 11, the inner race 36, the tapered rollers 42, the outer race 32, the tapered rollers 44, the inner race 38, the spacer 20, inner race 40, the tapered rollers 46 and the outer race 34 to a shoulder 56 in the cylindrical cavity in the main body 10. Thus, it may be seen that each bearing will carry an axial load substantially equal to the axial load exerted by the work piece 18 against the work engaging surface 22 of the spindle 11, as indicated by the arrows 51.

Since these anti-friction bearinges are perfectly seated as a result of the axial force, a true orbit of rotation for the spindle 11 in the main body 10 is automatically maintained at all times. This free center device maintains high accuracy in useful life with negligible maintenance, whereby machine work may be easily performed.

In Figure 2 is disclosed a preferred modification of the free center device. The cylindrical housing 60 houses angular contact type anti-friction bearings 62, 64 and 66. These bearings are so arranged as to carry substantially equal axial and substantially equal radial loads exerted by the work piece 68 engaging the work engaging portion 70.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. An improvement in a free center device including a main cylindrical body having a cylindrical cavity, said body having an extension forming a support therefor, a freely rotatable spindle having a work engaging portion and a supporting cylindrical portion projecting into the cavity of said main body, a pair of closely spaced tapered roller bearings positioned intermediate the supporting cylindrical portion of the spindle and the inner wall of the cylindrical cavity, said bearings having a common outer race member, said common race member having two frustum-conical inner surfaces flaring outwardly from the center of the member, one frustum-conical surface forming the outer race of one of the bearings and the other frustum-conical surface forming the outer race of the other bearing, said common outer race member being lightly press-fitted into the cavity, the inner race members of said pair of bearings being lightly press-fitted upon the cylindrical portion of the spindle, one of the inner races abutting a shoulder on the spindle, a spacer loosely press-fitted on the cylindrical portion of the spindle, the other inner race of said pair of bearings abutting said spacer, and a third tapered roller bearing having its inner race positioned on the inner end of the spindle, said inner race abutting said spacer, said improvement comprising the positioning of the bearings so as to obtain optimum distribution of the load forces absorbed by the bearings, this load distribution being accomplished by the resultant force of the first pair of bearings as obtained by the normals extending from the center of the outer races intersecting the axis of rotation of the spindles coinciding with the plane extending normal to the center between said pair of bearings, this resultant force of the first pair of bearings being positioned at a point one-half of the distance from the application of the load to the point where the normal from the center of the outer race of the third bearing intersects the axis of rotation of the spindle.

2. In a free center device according to claim 1, wherein the outer race of the third bearing abuts a shoulder in the inner end of the cylindrical cavity, said outer race having a frustum-conical inner surface flaring outwardly in a direction towards the pair of bearings, so that as the bearings wear the bearings are automatically tightened by the lightly press-fitted races moving endwise with the spindle into the hollow cylindrical cavity.

References Cited in the file of this patent

UNITED STATES PATENTS

| 1,345,368 | Kell | July 6, 1920 |
| 1,700,837 | Fisher | Feb. 5, 1929 |
| 1,747,385 | Olson | Feb. 18, 1930 |
| 1,993,809 | Schnelle | Mar. 12, 1935 |
| 2,193,042 | Roterberg | Mar. 12, 1940 |
| 2,314,622 | Klamp | Mar. 23, 1943 |

FOREIGN PATENTS

| 471,154 | Great Britain | Aug. 26, 1937 |